United States Patent
Gruner et al.

(10) Patent No.: US 6,496,923 B1
(45) Date of Patent: Dec. 17, 2002

(54) LENGTH DECODE TO DETECT ONE-BYTE PREFIXES AND BRANCH

(75) Inventors: Frederick Russell Gruner, Palo Alto, CA (US); Bharat Zaveri, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,534

(22) Filed: Dec. 17, 1999

(51) Int. Cl.[7] ................................ G06F 9/30
(52) U.S. Cl. ............... 712/213; 712/210; 712/233
(58) Field of Search ................ 712/210, 213, 712/233

(56) References Cited

U.S. PATENT DOCUMENTS

| | | | | |
|---|---|---|---|---|
| 5,353,420 A | * | 10/1994 | Zaidi | 712/210 |
| 5,537,629 A | * | 7/1996 | Brown et al. | 712/210 |
| 5,586,277 A | | 12/1996 | Brown et al. | 712/210 |
| 5,758,116 A | | 5/1998 | Lee et al. | 712/210 |
| 5,822,559 A | | 10/1998 | Narayan et al. | 712/214 |
| 6,175,908 B1 | * | 1/2001 | Pickett | 712/204 |

* cited by examiner

Primary Examiner—Kenneth S. Kim
(74) Attorney, Agent, or Firm—Blakley, Sokoloff, Taylor & Zafman LLP

(57) ABSTRACT

The invention provides a system and method which can be used for pre-decoding one-byte instruction prefixes and branch instruction indicators. A static line detect generates a number of instruction indicators. Further, a prefix and branch decode unit combines at least two of the number of instruction indicators, and a pre-decode unit decodes the combined instruction indicators. Embodiments of the invention decode one byte prefixes without additional cycle penalty and generate one and two byte branch indications early.

31 Claims, 8 Drawing Sheets

LENGTH DECODE TO DETECT ONE-BYTE PREFIXES AND BRANCH

FIELD OF THE INVENTION

The present invention pertains generally to the field of computer systems and more particularly to a system and method for length decode to detect one-byte prefixes and branch type macro-instructions.

BACKGROUND OF THE INVENTION

Processors (including, but not limited to, general and special purpose microprocessors, micro-controllers, and digital signal processors (DSPs)) typically include execution units that execute a sequence of instructions, termed micro-instructions, derived from a computer program. Many computer programs are written in a high level language that is not directly executable by the central processing unit (CPU) of a computer and the instructions of such programs must accordingly be decoded into a form suitable for execution by the CPU. For example, a program may be written in a high level language such as C, C++, or Java, and then compiled into a corresponding sequence of macro-instructions, which are in turn decoded into micro-instructions for eventual execution. Programs can also be written directly of a series of macro-instructions (that is, machine code).

Macro-instructions are commonly stored as contiguous data blocks in a memory resource, such as main memory (ergo, RAM) or in a cache, for retrieval and supplied to a decoder unit within a processor for decoding into micro-instructions. To enable the decoder unit to decode macro-instructions successfully, it will be appreciated that it is necessary to identify instruction boundaries within retrieved data blocks, that constitute the instruction stream, that indicate where one macro-instruction ends and the next begins.

In reduced instruction set computer (RISC) processor architectures and instruction sets, macro-instructions typically have a fixed length, in which case the boundaries between instructions can be determined with relative ease once an initial boundary is identified, as each instruction has a known length. For a variable-length instruction set, once an initial boundary location is identified, the length of each macro-instruction must be ascertained to identify subsequent instruction boundaries. The task of identifying boundaries is further complicated by a variable-length instruction set that, for the purposes of supporting legacy programs, supports multiple data and addressing sizes.

In one type of reduced instruction set processor, instructions may have one or more prefix bytes preceding an instruction which modify the operation of the instruction. In this type of instruction set, one-byte prefixes occur frequently, however, decoding such instructions add an additional cycle to the decoding process. In addition, when branch instructions are present, instruction flow may need to be redirected to the correct path. In this respect, branch instructions often lead to cycle delays.

SUMMARY OF THE INVENTION

A system and method for pre-decoding one-byte instruction prefixes and branch instruction indicators is described. A static line detect generates a number of instruction indicators. Further, a prefix and branch decode unit combines at least two of the number of instruction indicators, and a pre-decode unit decodes the combined instruction indicators.

BRIEF DESCRIPTION OF THE DRAWINGS

The objects, features and advantages of the present invention will be apparent to one skilled in the art in light of the following detailed description in which.

DETAILED DESCRIPTION

A system and method for pre-decoding one-byte instruction prefixes and instruction branch indicators is described. A static line detect generates a number of instruction indicators. Further, a prefix and branch decode unit combines at least two of the number of instruction indicators, and a pre-decode unit decodes the combined instruction indicators.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
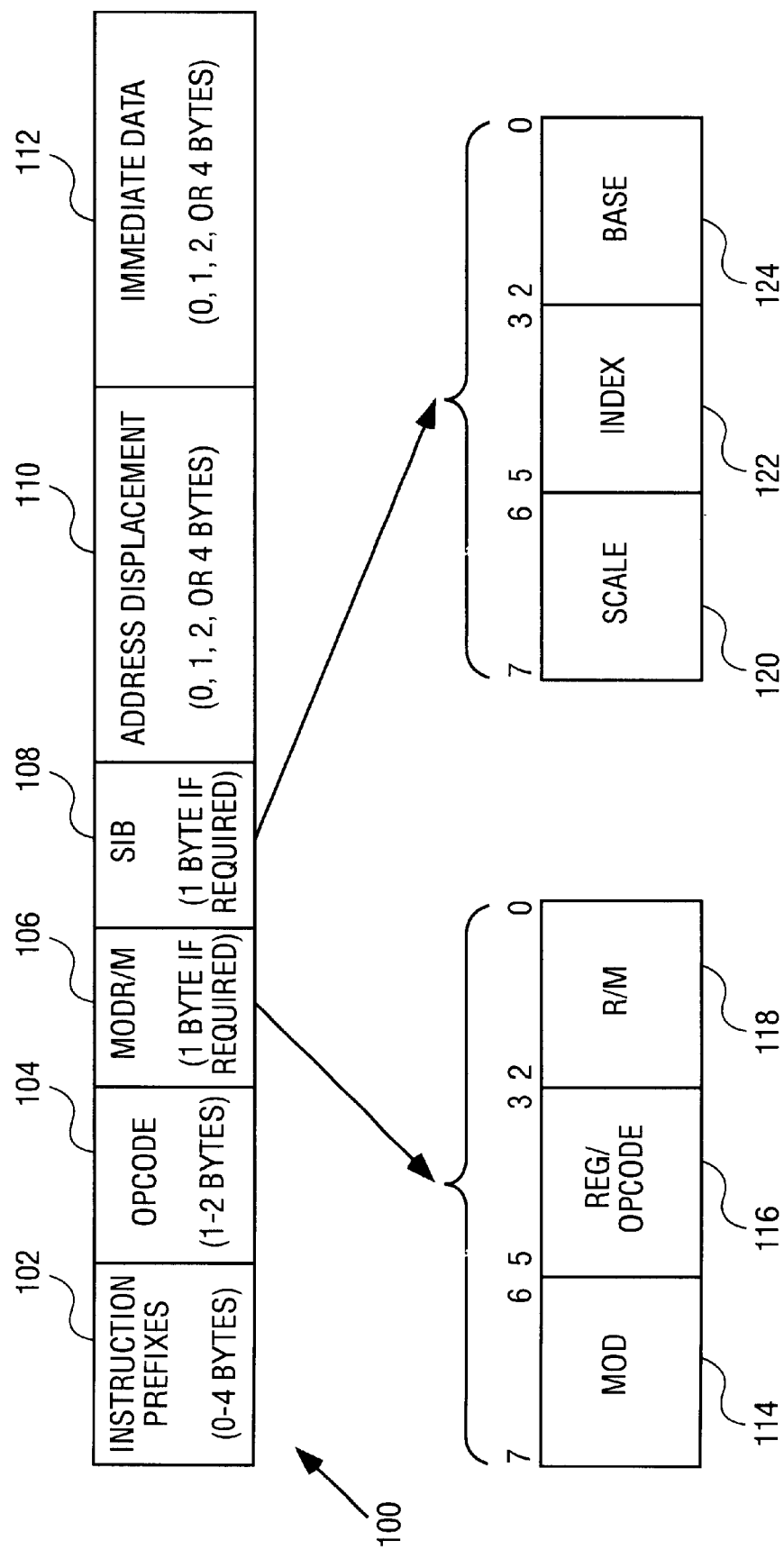
FIG. 1 is a block diagram for one embodiment of a macro-instruction consisting of bytes that may be decoded according to the present invention.

FIG. 1 is a diagrammatic representation of an exemplary macro-instruction 100 consisting of bytes that may be decoded according to the teachings of the present invention. Specifically, FIG. 1 illustrates the format of an exemplary macro-instruction forming the part of the Intel architecture (IA) instruction set, as developed by Intel Corporation of Santa Clara, Calif. For purposes of the present specification, the terms "macro-instruction" and "instruction" shall both be taken to refer to what is commonly understood to be a macro-instruction and not a micro-instruction.

As defined within the Intel architecture instruction set, an exemplary macro-instruction 100 may comprise one to four instruction prefixes 102 (each instruction prefix 102 one byte in length), an opcode 104 (one or two bytes in length), a ModR/M operand indicator 106 (0–1 byte in length), an SIB of 108 (0–1 lengths in byte), address displacement 110 (0, 1, 2, or 4 bytes in length), and an intermediate data constant 112 (0, 1, 2, or 4 bytes in length). Opcode 104 may be either one or two bytes in length. For two-byte opcodes, the first byte is 0F.

ModR/M, if present, is one byte in length and comprises a mod field 114, reg/opcode field 116 and the R/M field 118. The mod field 114 combines with the R/M field 118 to form 32 possible values: 8 register and 24 addressing modes. The reg/opcode field 116 specifies either a register number or three more bits of opcode information. The reg/opcode field 116 use is specified in the first byte of the primary opcode 104. The R/M field 118 may specify a register as operand or may be combined with the mod field 114 to encode an addressing mode. Certain encodings of the ModR/M byte 106 require a second addressing byte, the Scale Index Base (SIB) byte 108, to fully specify the addressing mode of the instruction. The base-plus-index and scale-plus-index forms of 32-bit addressing require the SIB byte 108. SIB byte 108 includes a scale field 120, which specifies the scale factor, index field 122, which specifies the register number of the index register, and base field 124 which specifies the register number of the base register.

Current processors, such as for example the Pentium Pro® or the Pentium II® Processors, may operate in either a 16- or 32-bit mode. Each macro-instruction may be decoded and executed as:

1. A fixed 8-bit data/address instruction;
2. A fixed 16-bit data/address instruction; or
3. A variable 16- or 32-bit data/address instruction, as determined by a mode operation bit (commonly termed a D-bit) within the IA processor.

Figure 2:
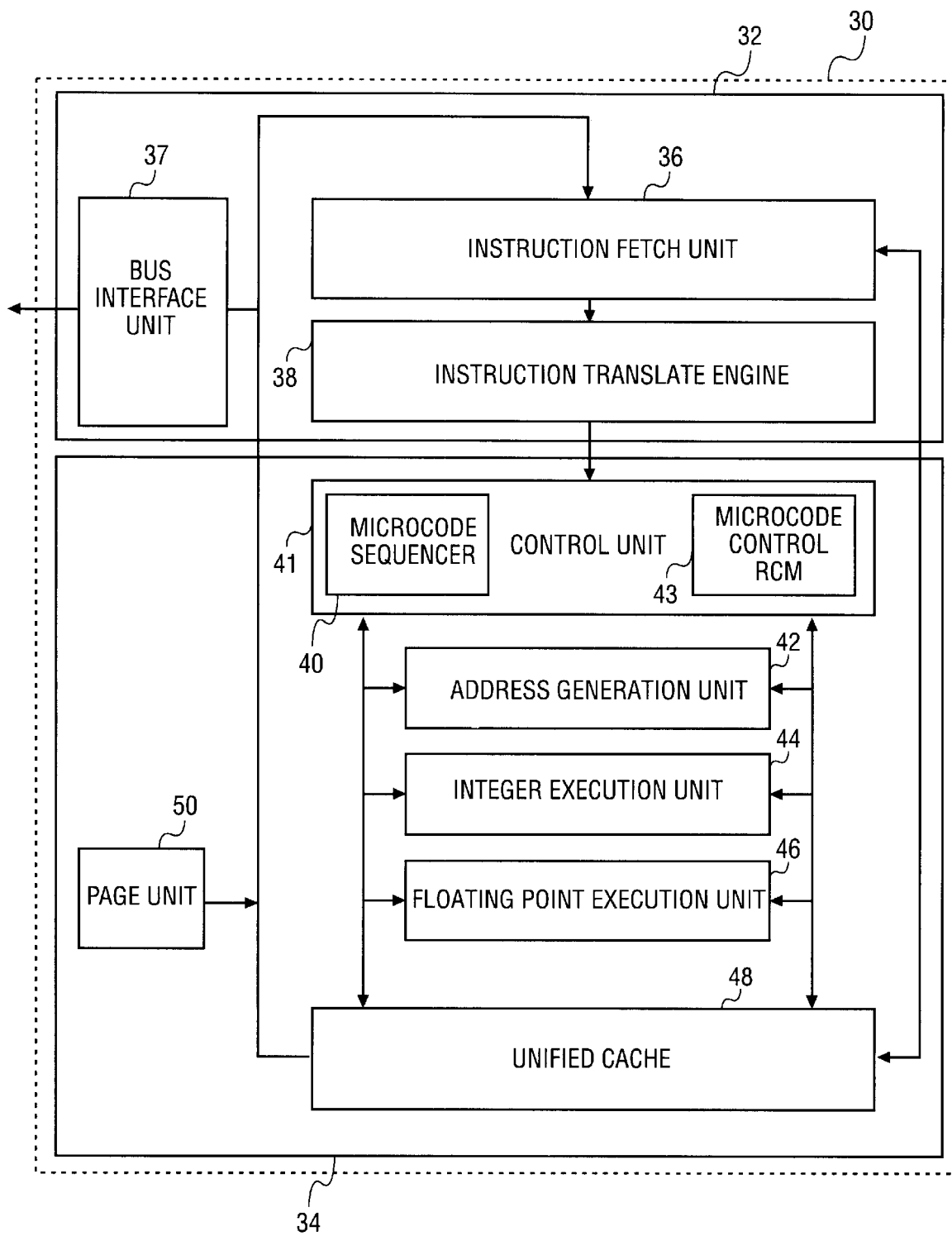
FIG. 2 is a block diagram showing an architecture of an exemplary microprocessor within which the present invention may be implemented.

FIG. 2 is a block diagram showing an exemplary microprocessor 30 within which the present invention may be implemented. The microprocessor 30 is pipelined and includes in-order front-end circuitry 32 and out-of-order back-end circuitry 34. The front-end circuitry 32 comprises an instruction fetch engine 36 that retrieves macro-instructions, which may conform to the format illustrated in FIG. 1, via a bus interface unit 37 from a main memory (not shown) associated with a microprocessor 30, or from an internal unified cache 48 that caches both macro-instructions and data. In an alternative embodiment, cache 48 may be located downstream of an instruction translate engine 38 and make cache decoded micro-instructions derived from macro-instructions. Macro-instructions retrieved by the instruction fetch engine 36 are then propagated to the instruction translate engine 38 that translates macro-instructions into corresponding micro-instructions. Micro-instructions are issued from the instruction translate engine 38 to a control unit 40 (also referred to as a microcode unit), that forms part of the back-end circuitry 34, and includes a microcode sequencer (MS) 41 and a microcode control read-only memory (ROM) 43. The control unit 40 interprets the micro-instructions sent to it, and handles exceptions, break points, and interrupts. From the control unit 40, micro-instructions are dispatched to a pipeline including an address generation unit 42, an integer execution unit 44 (also known as an arithmatic/logic unit (ALU)) and/or a floating point execution unit 46.

The microprocessor 30 further includes a page unit 50 that translates linear addresses into physical addresses, and includes at least one translation look-aside buffer (TLB) for this purpose.

Figure 3:
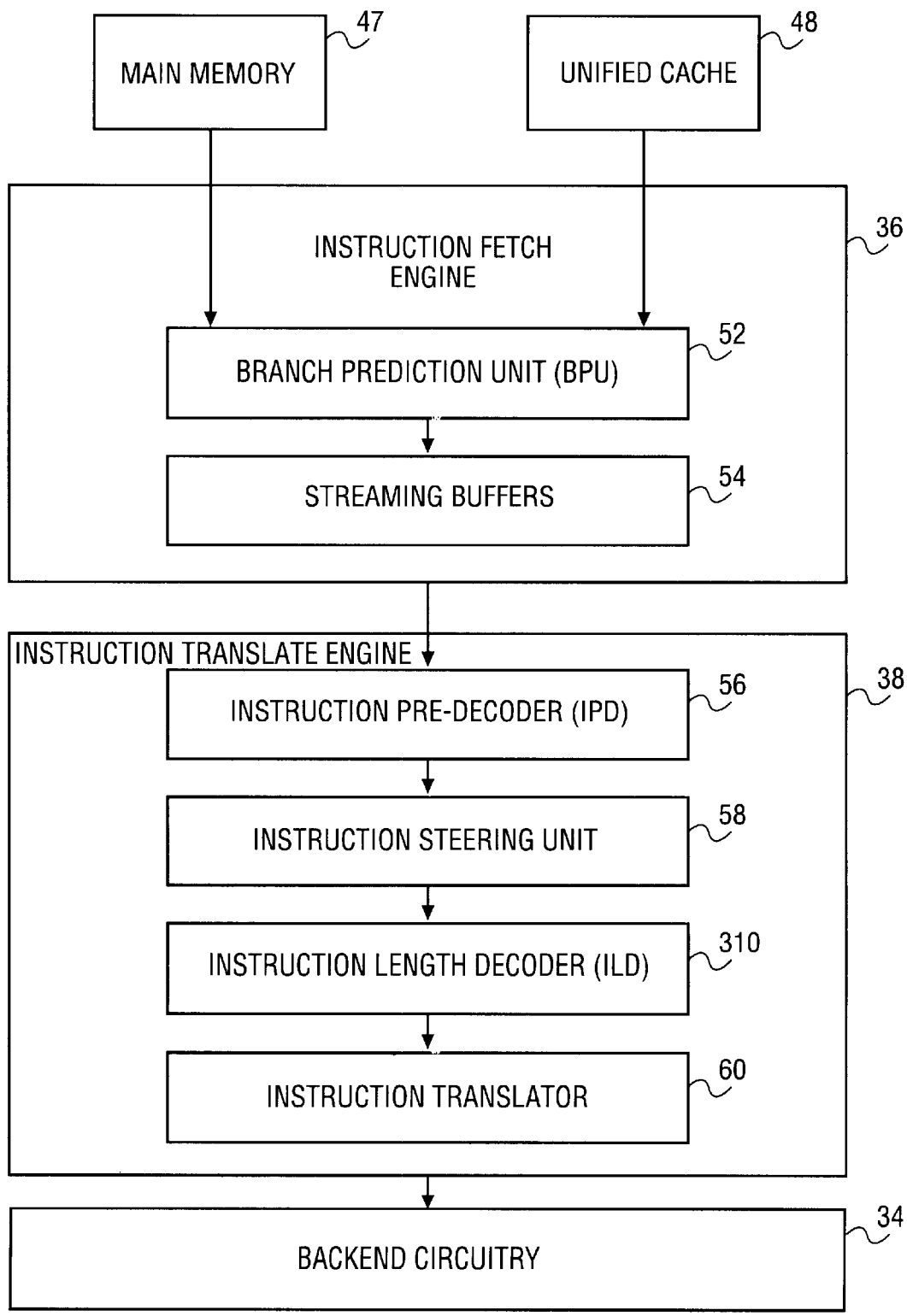
FIG. 3 is a block diagram showing architectural details regarding an instruction fetch engine and an instruction translate engine, according to exemplary embodiment of the present invention, that may be incorporated into the microprocessor shown in FIG. 2.

FIG. 3 is a block diagram showing further details regarding the instruction fetch engine 36 and the instruction translate engine 38 of the exemplary microprocessor shown in FIG. 2. The instruction fetch engine 36 is shown to include a Branch Prediction Unit (BPU) 52 that examines macro-instructions received from a main memory 47 or the unified cache 48 and provides speculative branch predictions for branch instructions encountered in the instruction stream based on, for example, a branch history maintained by the BPU 52. Streaming buffers 54 buffer macro-instructions before dispatch to an Instruction Pre-Decoder (IPD) 56 within the instruction translate engine 38.

Figure 4:
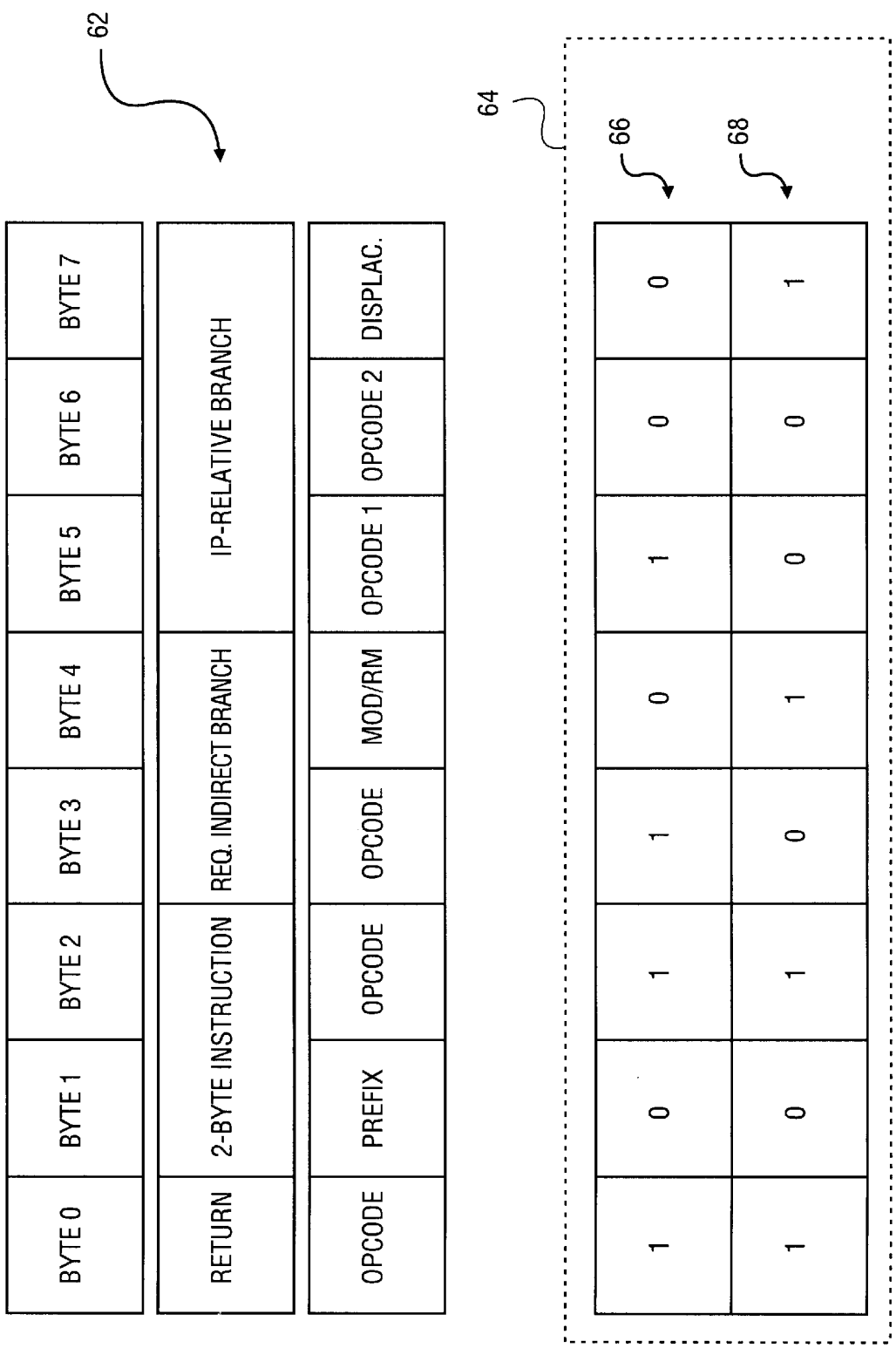
FIG. 4 is an exemplary block diagram of an 8-byte macro instruction block and an associate byte marking vector as generated by IPD of FIG. 3.

The IPD 56 is responsible for changing the instruction stream from byte-based information to instruction-based information. Specifically, the IPD 56 generates a byte-marking (or boundary marking) vector that marks bytes of the instruction stream that comprise first (START) or last (END) bytes of an instruction. The byte-marking vector is necessary as the instruction fetch engine 36 fetches contiguous blocks of instruction data (e.g., 8, 16, or 32 bytes) from either the main memory 47 or unified cache 48, these bytes then being propagated in parallel through the microprocessor 30. The microprocessor 30 requires some mechanism for identifying instruction boundaries within these contiguous blocks of instruction data, and the byte-marking vector provides this mechanism. An exemplary 8-byte macro-instruction block 62 and an associated byte-marking vector 64, as generated by the IPD 56, are illustrated in FIG. 4. The byte-marking vector 64 comprises a first (or START) byte marking vector 66, which contains set bits corresponding to the first bytes of instructions within the macro-instruction block 62, and a last (or END) byte marking vector 68, which contains set bits corresponding to the last bytes of instructions within the macro-instruction block 62.

Macro-instruction data blocks (or chunks) 62 and accompanying byte-marking vectors 64 are the propagated from the IPD 56 to an Instruction Steering (IS) unit 58. The IS unit 58 rotates and aligns the macro-instruction data utilizing the byte-marking vectors. The rotated and aligned macro-instructions are fed to Instruction Length Decoder (ILD) 310. ILD 310 propagates one-byte prefix and branch code signals and determines the length of the macro-instruction. The propagation of the one-byte prefix and branch code signals is performed prior to the length decode. The decoded macro-instructions are fed to the Instruction Translator (IT) unit 60 for translation into corresponding micro-instructions. The generated micro-instructions are then issued from the IT unit 60 to the back-end circuitry 34 for execution.

FIG. 4 is an exemplary block diagram of an 8-byte macro instruction block 62 and an associate byte marking vector 64 as generated by IPD 56. Byte marking vector 64 comprises a first (or start) byte marking vector 66 which contains set bits corresponding to the first bytes of instructions within the macro instruction block, and a last (or end) byte marking vector 68 which contains set bits corresponding to the last bytes of instructions within the macro-instruction block 62.

Macro instruction data blocks (or chunks) 62 and accompanying byte-marking vector 64 are the propagated form from the IPD 56 to an instruction steering (IS) unit 58. The IS unit 58 rotates and aligns the micro-instruction data utilizing the byte marking vectors so that macro-instructions are properly fed to the instruction translator (IT) unit 60 for translation into corresponding micro-instructions. The generated macro-instructions are then issued from the IT unit 60 to the back end circuitry 34 for execution.

Figure 5:
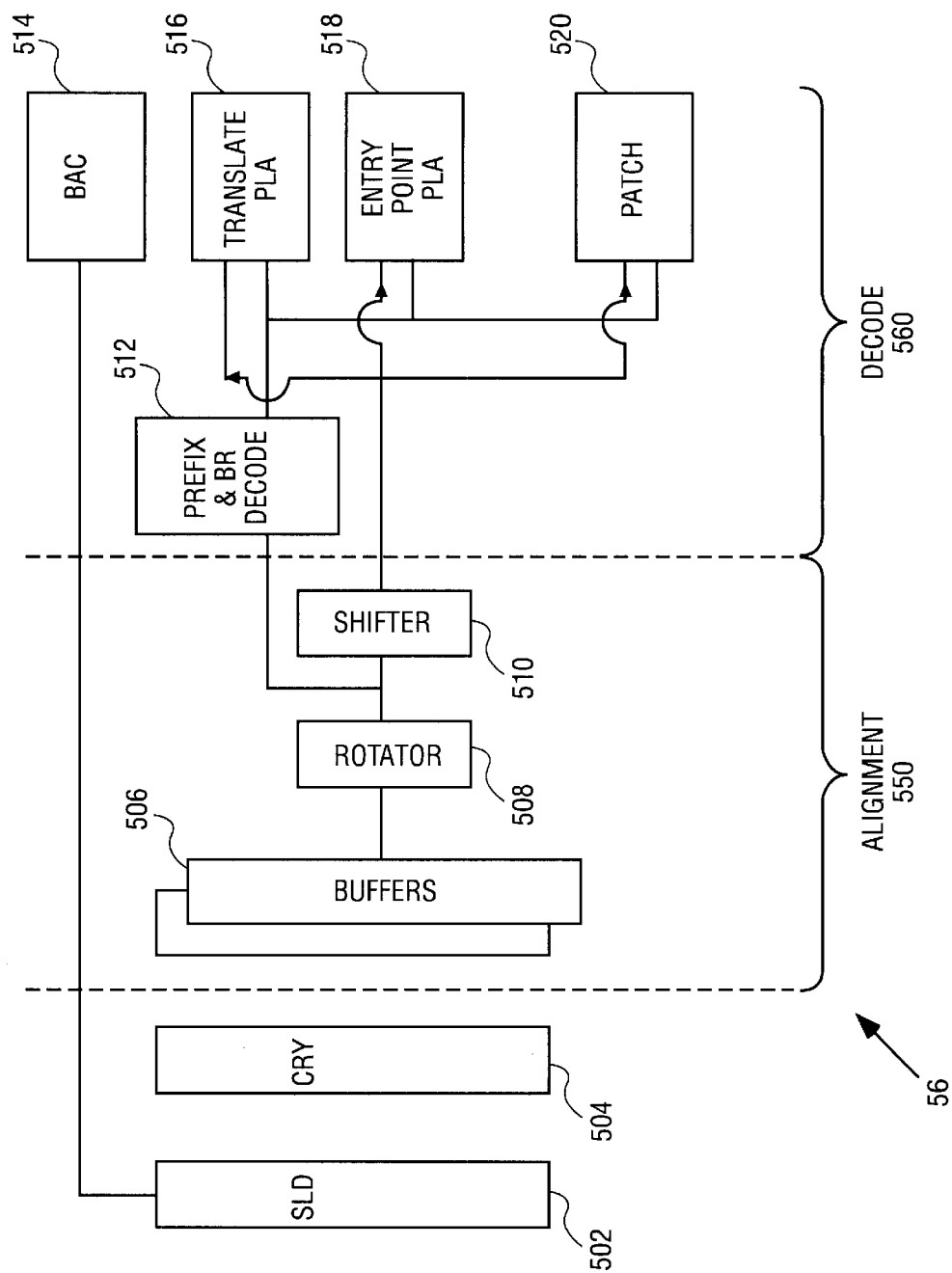
FIG. 5 is a block diagram of one embodiment of an architecture of the instruction pre-decoder (IPD) of FIG. 3.

FIG. 5 is a block diagram of one embodiment of an architecture of the instruction predecoder (IPD) 56. Instruction information is received into static line detect (SLD) 502 which generates all marker bit information for the instruction. The instruction information is transferred to the carry 504 for opcode marking and sent to buffers 506 within align unit 550. Eight bytes of instruction information (which for the purposes of the present specification may conveniently be termed an "eight-byte block") are received into buffers 506. The eight-byte blocks are fed into a two stage align code mechanism through rotator 508 and shifter 510. The aligned data is sent to decode 560 for decoding the instruction. Align unit 550 fetches one or more instructions from memory or cache and determines where the next instruction begins and ends. Instruction data is fetched from the cache and stored in buffer 506. ILD 56 determines the length of the current instruction in order to align the next instruction within the data stream. Instruction information is fed to decode unit 560 and into the translate PLA 516, entry point PLA 518, and patch PLA 520. All three PLAs (516, 518, 520) require marker bits in order to properly decode the instructions. In one embodiment, these PLAs (516, 518, 520) use address size, data size, repeat prefix, lock prefix, zero F two-byte opcode, and branch marker bits. In one embodiment, address size, operand size, and repeat prefixes occur more often than in a single prefix format and are supported with an early decode mechanism. Branch address calculator (BAC) 514 requires an indication whether a branch is present or not as early as possible in order to quickly redirect the flow of the data stream to the correct path when the branch is present and a statically predict whether branch is taken or not taken. In one embodiment, there are two types of branch indicators, a one byte branch and a two byte branch. Length decode logic detects one byte branch cases and checks for two byte branch cases (ERGO, FF/2, FF/3, 0F/ATTN, etc.).

Prefix and branch decode 512 multiplexes prefix and branch decode information and sends a bit-per-byte to the decode PLAs (516, 518, 520). The prefix and branch decode information is multiplexed during the length decode stage. The PLAs (516, 518, 520) extract prefix information for the decode logic and separate out branch present indication from the same bit as the opcode byte. The extraction is performed during the decode stage. The decode logic receives bit/byte indications as to whether a prefix is present or not. Data size uses bit and separates out prefix information and a one byte branch indication. Two byte branch cases are detected after extracting FF and 0F detect and qualifying them to cover all two byte branch cases. The 0F detect also indicates whether a one byte opcode or a two byte opcode is present. In one embodiment, the decode logic handles all one byte prefixes (except for non-performance critical lock prefixes) instructions without additional cycle penalty. In addition, in this embodiment, the decode logic generates one byte and two byte branch indications as early as possible at decode time and sends the branch indication to the branch redirection hardware and generates one byte opcode or two byte opcode indications early in the decode stage.

Figure 6:
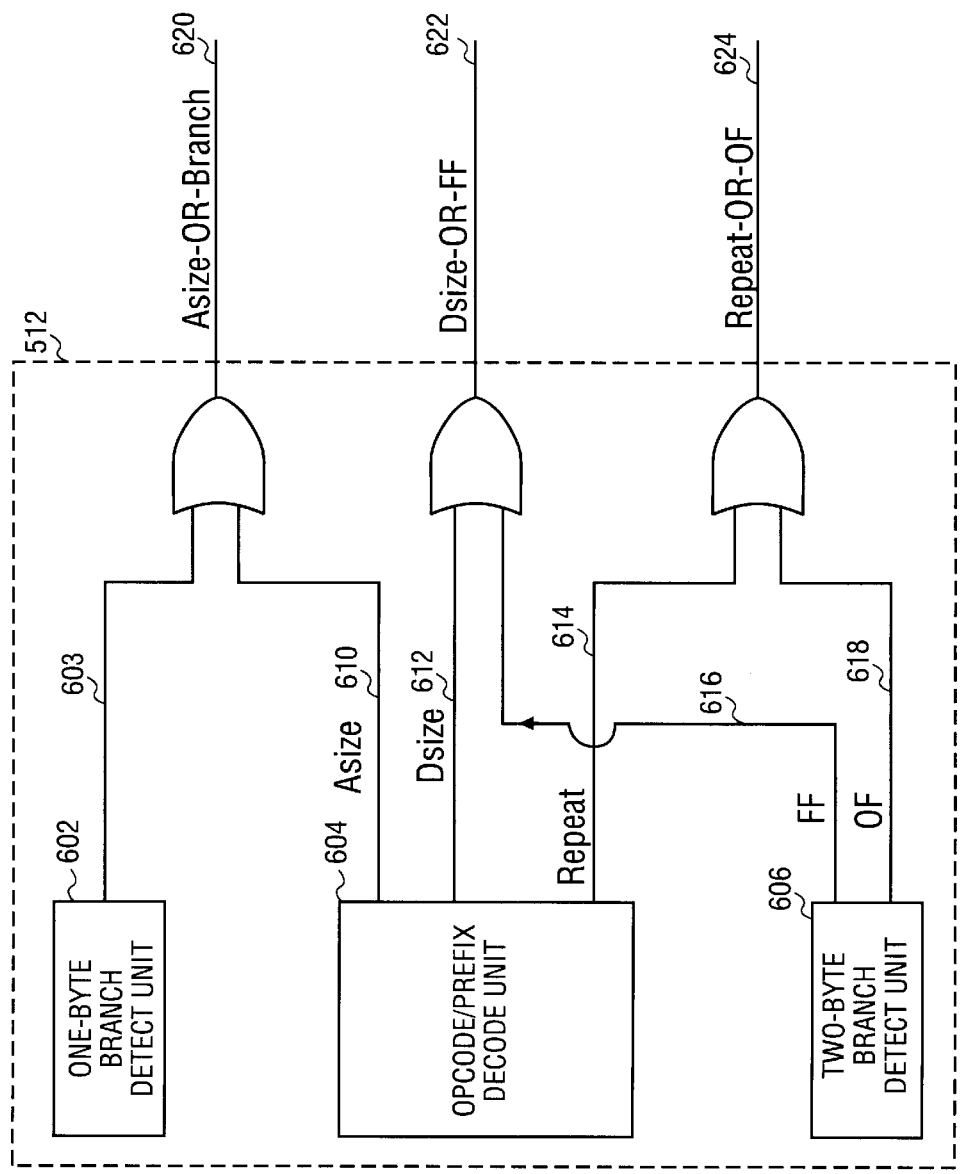
FIG. 6 is a block diagram of one embodiment for a prefix and branch decode unit of FIG. 5.

FIG. 6 is a block diagram of one embodiment for a prefix and branch decode unit 512. Within unit 512, one byte branch detect unit 602 detects if a one byte branch is present within the opcode of the instruction. In one embodiment, a one byte branch is indicated by [?] in the first byte of the opcode. Unit 512 also includes an opcode/prefix decode unit 604 to determine the data size (Dsize) 612, address size (Asize) 610, and repeat prefix 614 of the instruction block. In one embodiment, address size 610, data size 612, and repeat prefix 614 are the most common one-byte prefixes. Unit 512 also includes two byte branch detect unit 606. Two byte branch detect unit 606 determines if the instruction is a two byte branch (FF or 0F in the first byte of the opcode) and generates a 0F-two-byte branch signal 618 and a FF-two-byte branch signal 616. In one embodiment, unit 512 combines (OR) the one byte branch detect signal 603 with Asize signal 610 to produce Asize-OR-Branch signal 620; combines (OR) Dsize signal 612 with FF-two-byte branch signal 616 to produce Dsize-OR-FF signal 622; and combines (OR) repeat signal 614 with 0F-two-byte branch detect signal 618 to produce Repeat-OR-0F signal 624.

Figure 7:
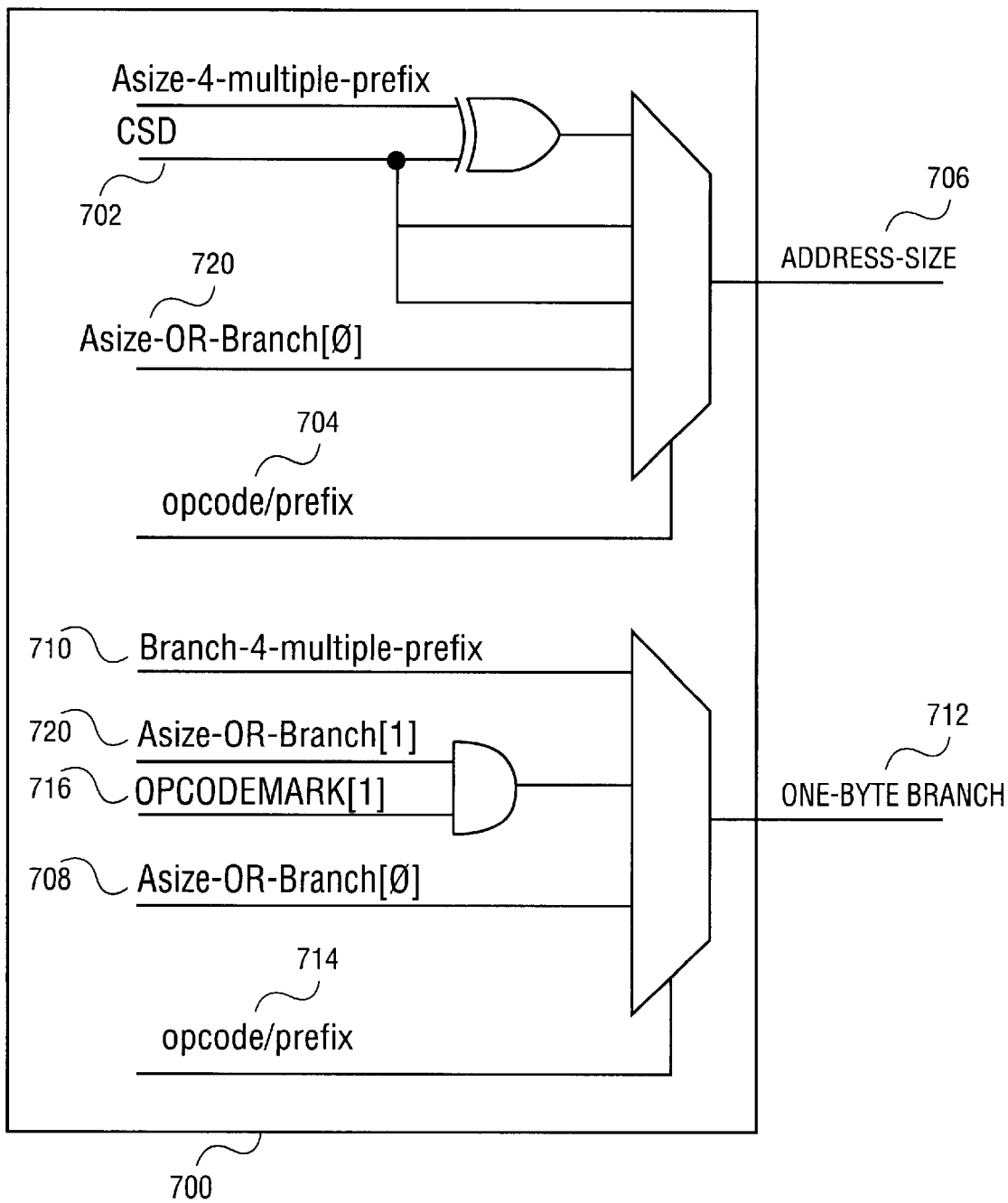
FIG. 7 is a block diagram of one embodiment for a pre-decode unit for decoding of various signals created by the prefix and branch unit of FIG. 5.

FIG. 7 is a block diagram of one embodiment for a pre-decode unit 700 for decoding of various signals created by unit 512. In one embodiment, the decodings take place at the entry point to the PLAs (516,518,520). The high order byte of Asize-OR-Branch signal 620 is multiplexed with opcode/prefix signal 704 and code segment descriptor (CSD) 702 to produce address size 706. In addition, Asize-OR-Branch signal 620 low order bits byte is ANDed together with the opcode mark low order byte 716. This signal is multiplexed with Asize-OR-Branch signal 620 high order byte, opcode prefix signal 714, and branch-for-multiple-prefix signal 710 to produce one-byte branch signal 712. Address size 706 and one-byte branch signal 712 are generated in parallel within the decode unit. Thus, the decode unit receives the notification whether a prefix is present or a branch is indicated in earlier stages of the decode process. CSD 702 indicates the operating mode of the machine (16-bit or 32-bit mode). In one embodiment, the address size prefix is ORed with the CSD to give the actual address size of the instruction. If the address size prefix is 0, CSD 0 indicates 16-bit and CSD 1 indicates 32-bit in one embodiment. In one embodiment, the data size prefix 32-bit mode indicates a 16-bit operand.

Dsize or FF signal 622 and repeat or 0F signal 624 may be multiplexed to generate the respective similars in a manner similar to that described above. Prefix and branch decode unit 512 uses single marker bits to send multiple information. In one embodiment, this reduces the amount of information generated within the instruction queues.

Figure 8:
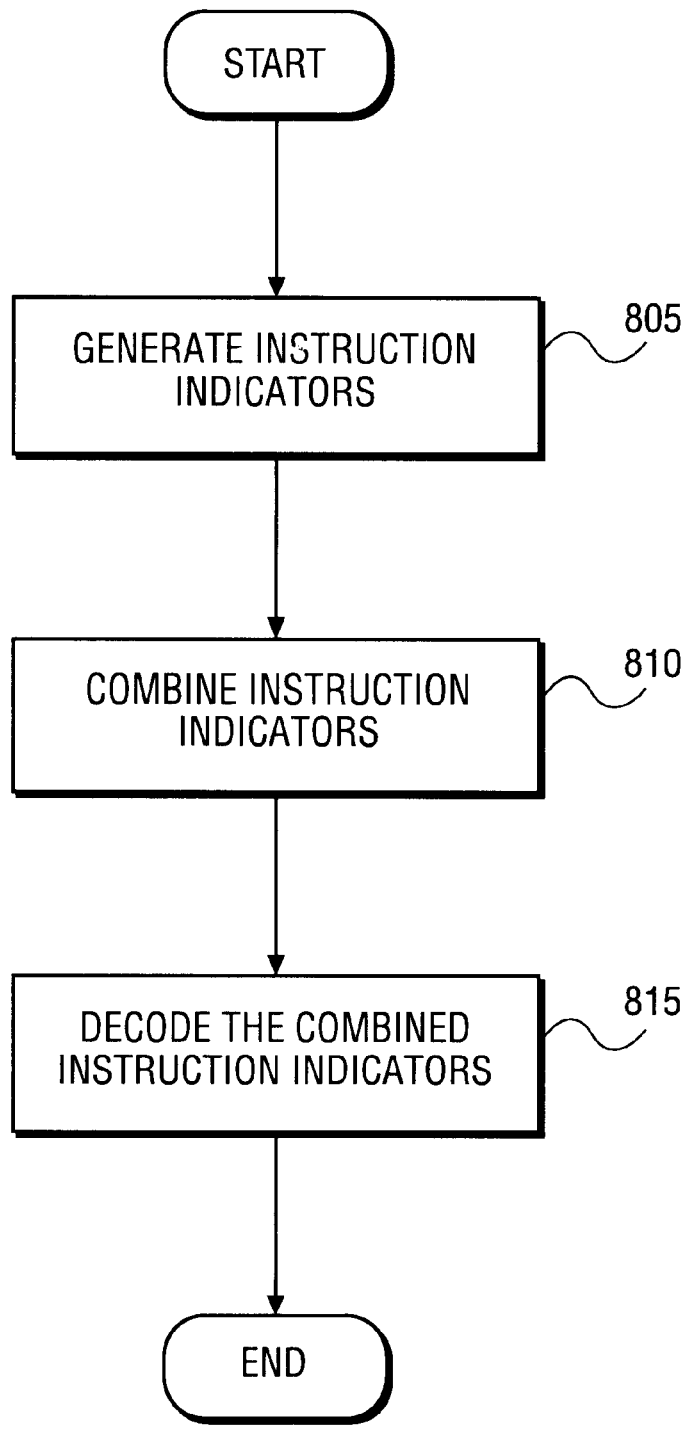
FIG. 8 is a flow diagram of one embodiment for pre-decoding one-byte instruction prefixes and instruction branch indicators.

FIG. 8 is a flow diagram of one embodiment for pre-decoding one-byte instruction prefixes and instruction branch indicators. Initially at processing block, a number of instruction indicators are created. In one embodiment, the instruction indicators are created by static line detector 502. Such indicators include, for example, address size indicator, one-byte branch indicator, data size indicator, repeat indicator, FF-two-byte branch indicator, and 0F-two-byte branch indicator.

At processing block 810, a set of instruction indicators are combined to form new indicators. In one embodiment, at least two of the indicators are combined into a single indicator. In one embodiment, a one-byte branch indicator is combined with an address size (Asize) indicator by an OR to produce an Asize-OR-Branch indicator; a data size (Dsize) indicator is combined with a FF-two-byte branch indicator by an OR to produce a Dsize-OR-FF indicator; and a repeat indicator is combined with a 0F-two-byte branch indicator by an OR to produce a Repeat-OR-0F indicator.

At processing block 815, the combined indicators are decoded to detect one-byte instruction prefixes and instruction branch indicators. In one embodiment, the indicators are multiplexed to separate the combined indicators prior to instruction decode. The combined indicators are multiplexed with opcode/prefix indicator and a code segment descriptor (CSD) indicator to produce the address size, data size, or repeat indicator. In addition and in parallel with the first multiplexing, the combined indicators are multiplexed with opcode/prefix indicator and a branch-for multiple prefix indicator to produce a one-byte branch indicator, a FF-two-byte branch indicator, or a 0F-two-byte branch indicator.

Several variations in the implementation for a system and method for length decode to detect one-byte prefixes and branch of macro-instructions have been described. The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather, it is limited only by the appended claims.

What is claimed is:

1. A method comprising:
   pre-decoding branch and instruction prefix information;
   combining the branch and instruction prefix information into a signal;
   sending bits to facilitate decoding the signal; and
   decoding the signal during an instruction decode phase based on the bits to detect one-byte prefix and branch information without incurring additional cycle penalty.

2. The method of claim 1 wherein the combining further comprises logically combining a one-byte branch indicator with an address size indicator to produce a signal indicative of an address size or branch information.

3. The method of claim 2 wherein the one-byte branch indicator and the address size indicator are combined by a logical or.

4. The method of claim 3 wherein the decoding comprises:
   a) multiplexing an address size or branch indicator with an opcode/prefix indicator and a code segment descriptor indicator to produce an address size; and
   b) multiplexing the address size or branch indicator with the opcode/prefix indicator to produce a one-byte branch indicator.

5. The method of claim 4 wherein operations a) and b) are performed in parallel.

6. The method of claim 1 wherein the combining further comprises logically combining a first two-byte branch indicator with a data size indicator to produce a signal indicative of data size or first two-byte branch indicator.

7. The method of claim 6 wherein the first two-byte branch indicator and the data size indicator are combined by a logical or.

8. The method of claim 7 wherein the decoding further comprises:
   a) multiplexing the data size or first branch indicator with an opcode/prefix indicator and a code segment descriptor indicator to produce a data size; and
   b) multiplexing the data size or second branch indicator with the opcode/prefix indicator to produce a first two-byte branch indicator.

9. The method of claim 8 wherein operations a) and b) are performed in parallel.

10. The method of claim 1 wherein the combining further comprises logically combining a second two-byte branch indicator with a repeat indicator to produce a signal indicative of a repeat or second two-byte branch indicator.

11. The method of claim 10 wherein the second two-byte branch indicator and the repeat indicator are combined by a logical or.

12. The method of claim 11 wherein the decoding further comprises:
   a) multiplexing the second two-byte branch indicator with an opcode/prefix indicator and a code segment descriptor indicator to produce a repeat indicator; and
   b) multiplexing the second two-byte branch indicator with the opcode/prefix indicator to produce a second two-byte branch indicator.

13. The method of claim 12 wherein operations a) and b) are performed in parallel.

14. The method of claim 1 wherein the decoding further comprises:
   multiplexing the combined indicators with an opcode/prefix indicator and a code segment descriptor indicator to produce an address size.

15. A system comprising:
   means for pre-decoding branch and instruction prefix information;
   means for combining the branch and instruction prefix information into a signal; means for sending bits to facilitate decoding the signal; and
   means for decoding the signal during an instruction decode phase based on the bits to detect one-byte prefix and branch information without incurring additional cycle penalty.

16. The system of claim 15 wherein the combining further comprises logically combining a one-byte branch indicator with an address size indicator to produce a signal indicative of an address size or branch information.

17. Logic for pre-decoding one-byte instruction prefixes and branch instruction indicators, comprising:
   a static line detector to generate a plurality of instruction indicators to indicate information associated with instructions in an instruction stream;
   a prefix and branch decode unit to combine at least two of the plurality of instruction indicators; and
   a pre-decode unit to decode the combined instruction indicators to detect one-byte instruction prefixes and instruction branch indicators.

18. The logic of claim 17 wherein the prefix and branch decode unit logically combines an one-byte branch indicator with an address size indicator to produce an address size or branch indicator.

19. The logic of claim 18 wherein the one-byte branch indicator and the address size indicator are combined by a logical or.

20. The logic of claim 18 wherein the pre-decode unit further:
   a) multiplexes an address size or branch indicator with an opcode/prefix indicator and a code segment descriptor indicator to produce an address size; and
   b) multiplexes the address size or branch indicator with the opcode/prefix indicator to produce a one-byte branch indicator.

21. The logic of claim 20 wherein operations a) and b) are performed in parallel.

22. The logic of claim 17 wherein the prefix and branch decode unit logically combines a first two-byte branch indicator with a data size indicator to produce a data size or first two-byte branch indicator.

23. The logic of claim 22 wherein the first two-byte branch indicator and the data size indicator are combined by a logical or.

24. The logic of claim 22 wherein the pre-decode unit further:
   a) multiplexes the data size or first branch indicator with an opcode/prefix indicator and a code segment descriptor indicator to produce a data size; and
   b) multiplexes the data size or second branch indicator with the opcode/prefix indicator to produce a first two-byte branch indicator.

25. The logic of claim 24 wherein operations a) and b) are performed in parallel.

26. The logic of claim 17 wherein the prefix and branch decode unit logically combines a second two-byte branch indicator with a repeat indicator to produce a repeat or second two-byte branch indicator.

27. The logic of claim 26 wherein the second two-byte branch indicator and the repeat indicator are combined by a logical or.

28. The logic of claim 27 wherein the pre-decode unit further:
  a) multiplexes the second two-byte branch indicator with an opcode/prefix indicator and a code segment descriptor indicator to produce a repeat indicator; and
  b) multiplexes the second two-byte branch indicator with the opcode/prefix indicator to produce a second two-byte branch indicator.

29. The logic of claim 28 wherein operations a) and b) are performed in parallel.

30. The logic of claim 17 wherein the prefix and branch decode unit further multiplexes the combined indicators with an opcode/prefix indicator and a code segment descriptor indicator.

31. An instruction pre-decoder for pre-decoding one-byte instruction prefixed and branch instruction indicators, comprising:
  a static line detector to generate a plurality of instruction indicators to indicate information associated with instructions in an instruction stream;
  a prefix and branch decode unit to combine at least two of the plurality of instruction indicators; and
  a pre-decode unit to decode the combined instruction indicators to detect one-byte instruction prefixes and instruction branch indicators.

* * * * *